US010495349B1

(12) United States Patent
Van Winkle (10) Patent No.: US 10,495,349 B1
(45) Date of Patent: Dec. 3, 2019

(54) BRACKET FOR MECHANICALLY ATTACHING A PHOTO-VOLTAIC PANEL OR OTHER OBJECT TO A T-POST

(71) Applicant: John Van Winkle, Tucson, AZ (US)

(72) Inventor: John Van Winkle, Tucson, AZ (US)

( * ) Notice: Subject to any disclaimer, the term of this patent is extended or adjusted under 35 U.S.C. 154(b) by 0 days.

(21) Appl. No.: 16/151,330

(22) Filed: Oct. 3, 2018

(51) Int. Cl.
*F24S 25/12* (2018.01)
*F24S 25/15* (2018.01)
*H02S 20/10* (2014.01)

(52) U.S. Cl.
CPC ............. *F24S 25/12* (2018.05); *F24S 25/15* (2018.05); *H02S 20/10* (2014.12)

(58) Field of Classification Search
CPC .. H02S 20/10; H02S 20/30; F24J 2/523; F24J 2/5232; F24J 2/5233; F24J 2/5235; F24S 25/10; F24S 25/12; F24S 25/13; F24S 25/15; F24S 25/16
USPC ....... 211/41.4; 248/228.3, 228.5, 219.2, 237; 47/46, 47; 52/173.3; 256/54, 55, 56, 57, 256/58
See application file for complete search history.

(56) References Cited

U.S. PATENT DOCUMENTS

| | | | | |
|---|---|---|---|---|
| 5,224,241 A | * | 7/1993 | Williams | E05D 5/0215 16/253 |
| 5,966,867 A | * | 10/1999 | Downer | A01G 17/04 47/46 |
| 6,145,246 A | * | 11/2000 | Galbraith | A01G 17/06 47/46 |
| 6,394,228 B1 | * | 5/2002 | Stephens | E06C 1/381 182/119 |
| 6,443,433 B1 | * | 9/2002 | Auldridge | E04H 17/1413 256/68 |
| 6,453,495 B1 | * | 9/2002 | Meggers | E01D 19/125 14/73 |
| 6,457,618 B1 | * | 10/2002 | Hancock | B60R 7/14 224/319 |
| 6,705,598 B2 | * | 3/2004 | Collins | E04H 17/08 256/35 |
| 7,958,886 B2 | * | 6/2011 | Barsun | H02S 20/30 126/600 |
| 8,480,061 B2 | * | 7/2013 | Graves | E04H 17/20 248/220.21 |
| 8,550,419 B2 | * | 10/2013 | Hausner | H02S 20/30 248/370 |
| 8,573,545 B2 | * | 11/2013 | Walquist | H02S 20/30 248/122.1 |

(Continued)

*Primary Examiner* — Jonathan Liu
*Assistant Examiner* — Guang H Guan

(57) ABSTRACT

A support structure for mounting a photovoltaic panel, wherein the support structure comprises a bracket assembly and a T-post with a top end and an engagement stud, wherein the bracket assembly comprises a cross angle positioned on the top end of the T-post, a vertical member extending from the cross angle, a plurality of angle mounts attached to the vertical member for mounting the photovoltaic panel, a cross bar positioned below the engagement stud of the T-post, a plurality of engagement fasteners extending through the cross angle and the cross bar, and a plurality of coupling fasteners configured to be tightened on the plurality of engagement fasteners to generate a clamping force between the cross angle and the cross bar so as to allow the cross angle to abut the top end of the T-post and allow the cross bar to abut the engagement stud of the T-post.

14 Claims, 5 Drawing Sheets

SIDE VIEW

FRONT VIEW (56) References Cited

U.S. PATENT DOCUMENTS

| | | | | |
|---|---|---|---|---|
| 8,882,073 B2 * | 11/2014 | Habdank | ............... | H02S 20/00 248/419 |
| 9,397,608 B2 * | 7/2016 | Mandry | ............... | H02S 20/10 |
| 9,444,396 B2 * | 9/2016 | Hirose | ............... | H02S 20/10 |
| 9,553,543 B2 * | 1/2017 | Kitano | ............... | H02S 20/00 |
| 9,660,568 B2 * | 5/2017 | Zuritis | ............... | H02S 20/10 |
| 10,094,596 B2 * | 10/2018 | McPheeters | ............... | H02S 20/00 |

* cited by examiner

FIG 1
SIDE VIEW

FIG 2
SIDE VIEW

FIG 3
SIDE VIEW

FIG 4
FRONT VIEW

FIG 5
SIDE VIEW

BRACKET FOR MECHANICALLY ATTACHING A PHOTO-VOLTAIC PANEL OR OTHER OBJECT TO A T-POST

A bracket which accounts for the vertical variability of a t-post stud and provides a secure mechanical attachment thus allowing for an object, such as a solar panel, to be attached and aligned to the top surface of a t-post. A t-post has a series of studs spaced incrementally along the length of the t-post. The distance of a stud from the top surface varies from one t-post to the next. Primary components of the bracket are:

1) A cross angle piece which rests on the top of the t-post. Having slotted holes and a rounded corner, the cross angle allows for rotation of the fasteners mentioned below, such that the fasteners can align the cross bar to the stud position.

2) A lower cross bar which is positioned underneath the stud located nearest to the top of the t-post.

3) Two bolts, positioned on either side of the t-post, join the cross angle and cross bar. The length and rotation of the bolts allows for the cross bar to be placed underneath the stud located nearest to the top of the t-post.

When the bolts are tightened and secured with a self locking nut, the angle piece and cross bar provide a secure mechanical attachment to the t-post. The angle piece provides a surface to which objects can be mounted.

4) An upper mounting component, integral to the cross angle, to which a photo-voltaic panel or other object can be secured. This upper mounting component provides connection points for two photo-voltaic panels or other objects. The upper mounting component consists of a vertical which connects to two angle mounts. Each angle mount can support one photo-voltaic panel or other object.

Any combination of t-posts, embedded into the ground at different depths, can be used to form an underlying support structure for an object such as a photo-voltaic panel.

The bolts and nuts which supply the clamping force can be supplemented with other types of mechanical fasteners, provided these fasteners adequately join the cross bar and cross angle.

BACKGROUND OF THE INVENTION

The field of endeavor for this invention is to simplify support structures for ground mounted solar panels or other objects. This bracket provides an attachment to commonly available t-posts, while providing a resolution to the issue that the vertical location of the common t-post stud is variable. The bracket mounts to a t-post and is adjustable to account for the variable location of the stud nearest to the top of any common t-post. The cross bar is placed underneath the stud and the cross angle is placed on the top back of the t-post. The bolts/nuts are tightened to provide a clamping force which secures the bracket assembly to the t-post. A vertical is integral to the cross angle. The vertical joins two angle mounts with a mechanical fastener. The angle mounts support one or more photo-voltaic panels. A photo-voltaic panel is connected to the angle mounts with a mechanical fastener. This assembly provides a structurally sound and secure mounting point for a photo-voltaic panel or other object. This bracket used in conjunction with t-posts embedded in the ground will be an efficient way to build ground mounted photo-voltaic systems.

This bracket can be used to attach a photo-voltaic panel directly to the top of a t-post thus eliminating the need for other more complicated mounting systems. This bracket provides a consistent measurable mounting location for an object, by adjusting to the vertically varying t-post stud location.

When t-posts are embedded in the ground in sets of two, the back row having a t-post higher out of the ground and the front row having a t-post further in the ground, a photo-voltaic panel can be provided with a desired tilt.

BRIEF SUMMARY OF THE INVENTION

This bracket solves the issue of providing a sound mechanical means of mounting a photo-voltaic panel or other object to the top of a t-post. This bracket allows for the alignment of the top surface of t-posts by adjusting to the variability in the manufactured state of a t-post.

The bracket resists applied structural loads (tension, compression and shear). Combined with an upper mounting component, integral to the cross angle, rotational, vertical and horizontal alignment can be provided. The bracket, when used to mount photo-voltaic panels, eliminates the need for complicated mounting structures, reducing the system to t-posts, the bracket and the photo-voltaic panel.

The end result is a more economical mounting system.

BRIEF DESCRIPTION OF THE SEVERAL VIEWS OF THE DRAWING

FIG. 2 is a side view consisting of the following;
1. t-post
   a) t-post stud
2. bolt
3. nut
4. cross bar
5. cross angle The purpose of FIG. 2 is to show the condition in which 1a is at the lowest vertical position with respect to the top surface of 1. Object 2 rotates so that 4 is placed under 1a. When 3 is tightened, 4 and 5 are secured in place. Slots in 5 allow for 2 to rotate as needed. The length of 2 is sufficient such that it can accommodate the vertical positioning of 1a.

FIG. 3 is a side view consisting of the following;
1. t-post
   a) t-post stud
2. bolt
3. nut
4. cross bar
5. cross angle
6. vertical
7. angle mount The purpose of FIG. 3 is to show a general condition in which 4 is positioned underneath 1a, connected to 5 by tightening 2 by turning 3. This general condition also shows components 6 and 7. Object 6 is integral to 5 and acts as a connecting point for 7. Object 7 provides a surface which is rotationally and vertically adjustable. Object 7 provides a mounting point which is suitable for the standard mounting location of a photo-voltaic panel utilizing mechanical fasteners.

FIG. 5 is a simplified side view consisting of the following
1. t-post
8. FIGS. 1-5
9. Typical photo-voltaic panel
10. Ground/Terrain/Earth/Grade The purpose of FIG. 5 is to show how 1 can be driven into 10 at different depths to provide a tilt angle for 9. Multiple rows/columns of 1 can support any multiple of 9.

DETAILED DESCRIPTION OF THE INVENTION

This invention is a bracket assembly which mechanically attaches to a generic t-post allowing for objects, such as a photo-voltaic panels to be supported off of the ground. The bracket is comprised of several primary components. The primary components are assembled together to form the bracket assembly. The assembly is designed to adjust to the varying vertical placement of a t-post stud. Reference FIGS. 1-5

Figure 1:
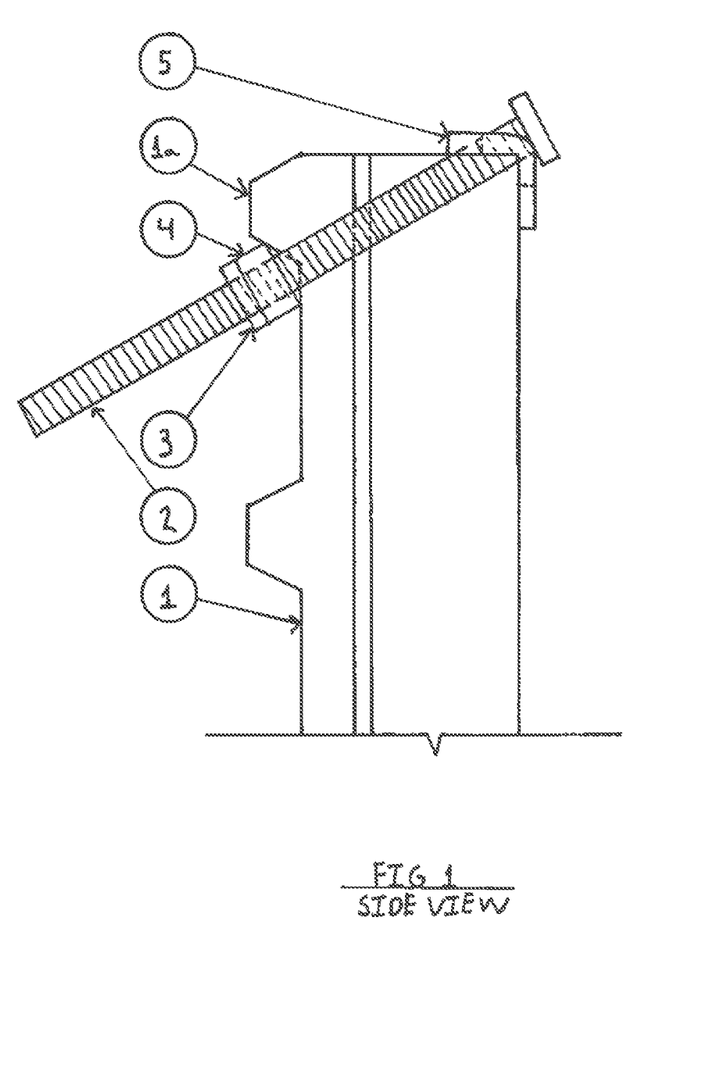
FIG. 1 is a side view consisting of the following;
1. t-post
   a) t-post stud
2. bolt
3. nut
4. cross bar
5. cross angle The purpose of FIG. 1 is to show the condition in which 1a is immediately below the top surface of 1. Object 2 rotates so that 4 is placed under 1a. When 3 is tightened, 4 and 5 are secured in place. Slots in 5 allow for 2 to rotate as needed.
Figure 2:
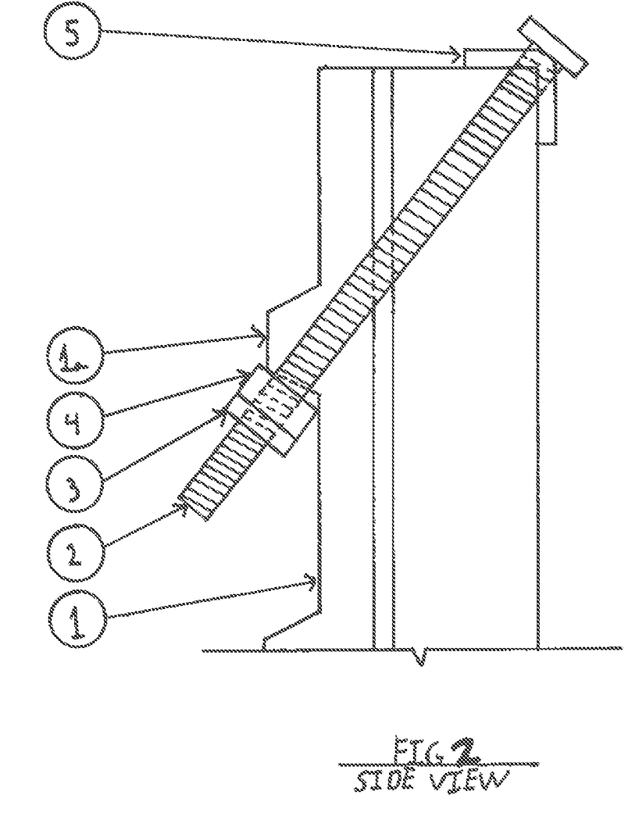
Figure 3:
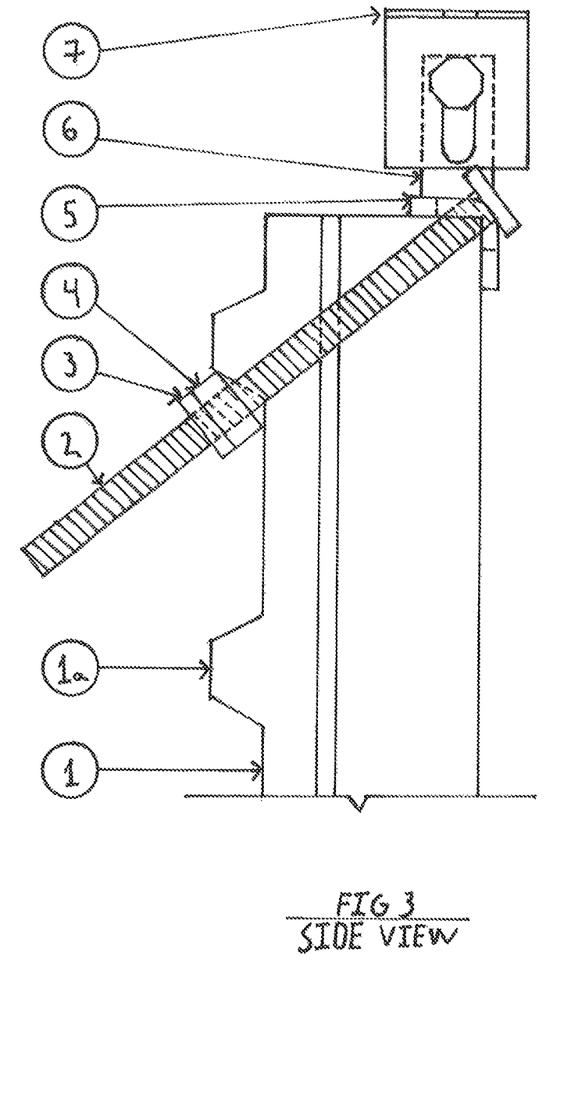
Figure 4:
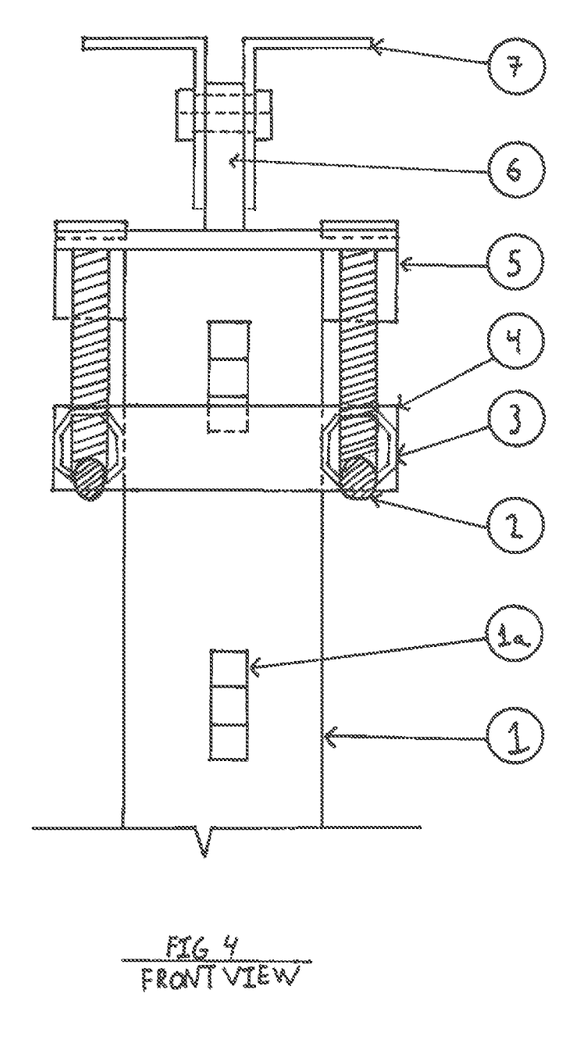
FIG. 4 is a front view consisting of the following;
1. t-post
   a) t-post stud
2. bolt
3. nut
4. cross bar
5. cross angle
6. vertical
7. angle mount The purpose of FIG. 4 is to provide a front view showing the quantities of components utilized. Excluding the t-post, the bracket assembly consists of two bolts, two nuts, one cross bar, one cross angle, one vertical and two angle mounts.
Figure 5:
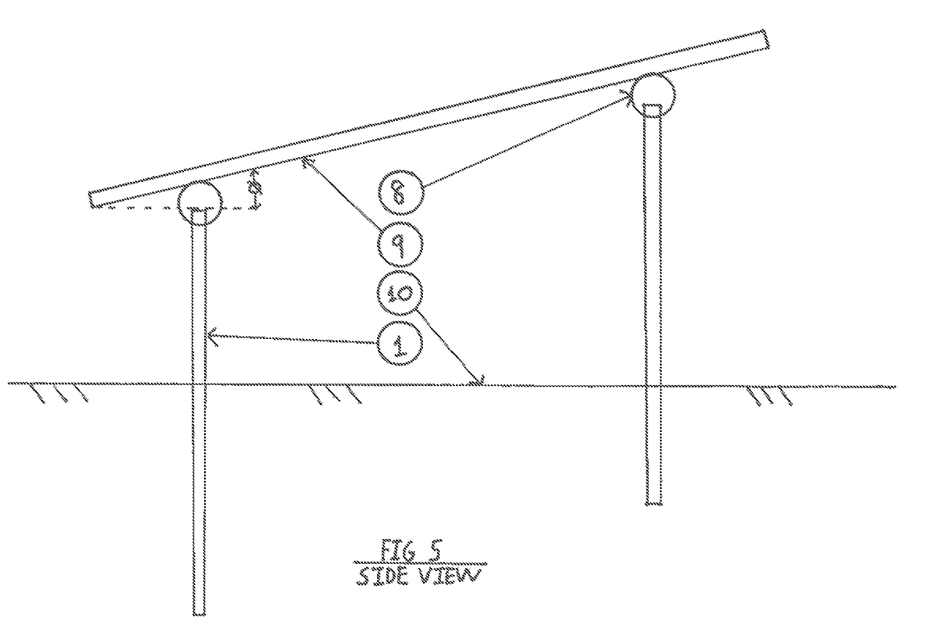

Object 7 (quantity 2); ANGLE MOUNT, is metallic, stainless steel, galvanized steel, aluminum or other sound material. It is either a pre-manufactured angle piece that is cut to length or it is a stamped or formed piece. The angle mount has oblong holes, that are punched, drilled or formed, allowing it to connect to the vertical (Object 6), and also connect to an object such as a photo-voltaic panel. The angle mounts are secured to the vertical by a mechanical fastener, such as a bolt and nut or rivet. A photo-voltaic panel or other object is secured to the angle mount by a mechanical fastener.

Object 6 (quantity 1); VERTICAL, is metallic, stainless steel, galvanized steel, aluminum or other sound material. Object 6 has a vertical oblong hole which is punched, drilled or formed and accepts mechanical fasteners. The vertical is integral to the cross angle and can be made as one component. The vertical may also be secured to the cross angle by welding, fastening or another method that provides a sound mechanical connection.

Object 5 (quantity 1); CROSS ANGLE, is metallic, stainless steel, galvanized steel, aluminum or other sound material. It is either a pre-manufactured angle piece that is cut to length or it is a stamped or formed piece. The cross angle has oblong holes, that are punched, drilled or formed. These oblong holes are on both the vertical and horizontal face of the cross angle. The corner of the cross angle is rounded. The cross angle is sized to accommodate the other components in the assembly along with the dimensions of a t-post.

Object 4 (quantity 1); CROSS BAR, is metallic, stainless steel, galvanized steel, aluminum or other sound material. It is made by first cutting a square metallic shape to length, or stamping or forming. The holes in the cross bar, which accept bolts, can either be drilled, punched or formed. The holes could also be threaded to eliminate the required nut. The cross bar is long enough to accommodate the other components along with the dimensions of a t-post. The hole location in the cross bar through which the bolt passes, is located such that the center line of the bolts will always align below the t-post stud.

Object 3 (quantity 2); NUT, is metallic, stainless steel, galvanized steel, aluminum or other sound material. The nut has a self locking feature such that when it is turned to a desired torque, it will not loosen.

Object 2 (quantity 2); BOLT, is metallic, stainless steel, galvanized steel, aluminum or other sound material. The overall length of the bolt is based on the variable location of the t-post stud and the dimensions of the components through which the bolt passes.

Object 1a, a t-post stud, is made from steel and is integral to a t-post. During the manufacturing process of a t-post, a continuous length of t-post is formed with studs at a consistent spacing. When the t-posts are cut to a desired length, the distance from the top of the t-post to the first t-post stud varies.

Object 1, a t-post, is made from steel and includes object 1a along its length. A t-post is commonly produced and is available in different lengths.

The bracket assembly is formed by first passing two bolts through the holes in the cross angle. The bolts are then passed through the holes in the cross bar. Nuts are used to secure the cross bar to the bolts. The distance between the cross bar and the cross angle is left at its maximum to facilitate installation onto a t-post. The angle mounts are secured to the vertical (which is integral to the cross angle) via a mechanical fastener.

In the field, the desired quantity of t-posts are driven into the earth to a desired depth, spacing, and alignment. Whether the t-post studs face forwards or backwards does not matter so long as the orientation of the t-posts is consistent throughout.

The bracket assembly is placed on top of the t-post such that the cross angle is resting on the upper back of the t-post. Upper back means that the cross angle is opposite the t-post studs. The cross bar is aligned below the t-post stud closest to the top of the t-post. The nuts are tightened, generating a clamping force between the cross bar and cross angle, forming a sound mechanical connection.

Objects, such as photo-voltaic panels are then secured to the angle mounts using a mechanical fastener. The angle mounts and vertical have slotted holes to allow for multi-directional and rotational adjustment. Each bracket assembly has two angle mounts. Each angle mount supports one photo-voltaic panel or other object. This means that two photo-voltaic panels or other objects can share one bracket assembly.

A typical photo-voltaic panel requires support at four points. Example, if only one photo-voltaic panel is to be supported then four t-posts and bracket assemblies would be needed. If two photo-voltaic panels were to be supported then six t-posts and bracket assemblies would be needed since one bracket assembly can support two photo-voltaic panels. As the number of photo-voltaic panels to be supported increases the required number of t-posts and bracket assemblies decreases. Consider one t-post and one bracket assembly as unit X, and the quantity of solar panels to be supported as unit N. The quantity of t-posts and brackets needed can be determined by the following equation. X=2 (N+1)

That which is claimed:

1. A support structure for mounting at least one photovoltaic panel, the support structure comprising:
   a T-post having a top end and a plurality of studs evenly spaced apart along a longitudinal axis of the T-post, the plurality of studs having an engagement stud positioned closest to the top end of the T-post among the plurality of studs; and
   a bracket assembly coupled with the T-post, wherein the bracket assembly includes:
      a cross angle positioned on the top end of the T-post, the cross angle having a first portion and a second portion substantially perpendicular to the first portion, the cross angle defining a first slotted hole and a second slotted hole;
      a vertical member extending from the first portion of the cross angle and having an adjustment slot;
      a plurality of angle mounts attached to the vertical member, each of the plurality of angle mounts having a horizontal component and a vertical component, the horizontal component of each of the plurality of angle mounts having a mounting slot for mounting the at least one photovoltaic panel, the vertical component of each of the plurality of angle mounts having a connection slot;
      a mounting fastener extending through the connection slots of the plurality of angle mounts and the adjustment slot of the vertical member to adjustably attach the plurality of angle mounts to the vertical member such that each of the plurality of angle mounts is vertically and rotationally adjustable with respect to the vertical member;
      a cross bar positioned below the engagement stud, the cross bar having a first bar hole and a second bar hole;
      a first engagement fastener extending through the first slotted hole of the cross angle and the first bar hole of the cross bar;
      a second engagement fastener extending through the second slotted hole of the cross angle and the second bar hole of the cross bar;
      a first coupling fastener coupled with the first engagement fastener; and
      a second coupling fastener coupled with the second engagement fastener;
   wherein the first and second coupling fasteners are configured to be tightened on the first and second engagement fasteners, respectively, to generate a clamping force between the cross angle and the cross bar so as to allow the cross angle to abut against the top end of the T-post and allow the cross bar to abut against the engagement stud.

2. The support structure according to claim 1, wherein the first bar hole of the cross bar is aligned with the first slotted hole of the cross angle adjacent a first lateral side of the T-post and the second bar hole of the cross bar is aligned with the second slotted hole of the cross angle adjacent a second lateral side of the T-post, such that the cross angle and the cross bar are horizontally adjustable with respect to the T-post.

3. The support structure according to claim 1, wherein the first and second engagement fasteners are movable within the first and second slotted holes of the cross angle, respectively, to allow adjustment of the cross bar with respect to the first and second engagement fasteners for accommodating a location of the engagement stud on the T-post with respect to the top end of the T-post.

4. The support structure according to claim 1, wherein the engagement stud is spaced apart from the top end of the T-post along the longitudinal axis of the T-post.

5. The support structure according to claim 1, wherein an upper end of the engagement stud and the top end of the T-post are positioned at a same elevation along the longitudinal axis of the T-post.

6. The support structure according to claim 1, wherein each of the first and second engagement fasteners is a bolt.

7. The support structure according to claim 1, wherein each of the first and second coupling fasteners is a nut.

8. The support structure according to claim 1, wherein the cross angle abuts against a front side of the T-post and the cross bar abuts against a rear side of the T-post.

9. The support structure according to claim 1, wherein the cross angle, the vertical member, the plurality of angle mounts, and the cross bar are each made of a metallic material.

10. The support structure according to claim 1, wherein the cross angle and the vertical member are formed as an integral piece.

11. The support structure according to claim 1, wherein the vertical member is mechanically attached to the first portion of the vertical member.

12. The support structure according to claim 1, wherein the vertical member is welded to the first portion of the vertical member.

13. A mounting assembly comprising one or more photovoltaic panels mounted to a plurality of support structures according to claim 1.

14. A method of mounting at least one photovoltaic panel, the method comprising:
   providing a plurality of support kits, each of the plurality of support kits including:
      a T-post having a top end and a plurality of studs evenly spaced apart along a longitudinal axis of the T-post, the plurality of studs having an engagement stud positioned closest to the top end of the T-post among the plurality of studs; and
      a bracket assembly configured to be coupled with the T-post, wherein the bracket assembly includes:
         a cross angle configured to be positioned on the top end of the T-post, the cross angle having a first portion and a second portion substantially perpendicular to the first portion, the cross angle defining a first slotted hole and a second slotted hole;
         a vertical member extending from the first portion of the cross angle and having an adjustment slot;
         a plurality of angle mounts attached to the vertical member, each of the plurality of angle mounts having a horizontal component and a vertical component, the horizontal component of each of the plurality of angle mounts having a mounting slot for mounting the at least one photovoltaic panel, the vertical component of each of the plurality of angle mounts having a connection slot;
         a mounting fastener extending through the connection slots of the plurality of angle mounts and the adjustment slot of the vertical member to adjustably attach the plurality of angle mounts to the vertical member such that each of the plurality of angle mounts is vertically and rotationally adjustable with respect to the vertical member;

a cross bar configured to be positioned below the engagement stud, the cross bar having a first bar hole and a second bar hole;

a first engagement fastener extending through the first slotted hole of the cross angle and the first bar hole of the cross bar;

a second engagement fastener extending through the second slotted hole of the cross angle and the second bar hole of the cross bar;

a first coupling fastener coupled with the first engagement fastener; and a second coupling fastener coupled with the second engagement fastener;

wherein the first and second coupling fasteners are configured to be tightened on the first and second engagement fasteners, respectively, to generate a clamping force between the cross angle and the cross bar so as to allow the cross angle to abut against the top end of the T-post and allow the cross bar to abut against the engagement stud;

embedding the T-post of each of the plurality of support kits into a support element or the earth, wherein the T-posts of the plurality of support kits form a first row of T-posts and a second row of T-posts parallel to the first row of T-posts, wherein the top ends of the T-posts in the first row of T-posts are positioned farther from the support element or the earth than the top ends of the T-posts in the second row of T-posts to allow a tilt orientation of the at least photovoltaic panel with respect to the T-posts of the plurality of support kits;

attaching the bracket assembly of each of the plurality of support kits to the T-post of a corresponding one of the plurality of support kits; and securing the at least one photovoltaic panel to the bracket assemblies of the plurality of support kits with mechanical fasteners.

\* \* \* \* \*